US012638759B2

(12) United States Patent
Banno et al.

(10) Patent No.: US 12,638,759 B2
(45) Date of Patent: May 26, 2026

(54) COOLING DEVICE, LIGHT-SOURCE DEVICE, IMAGE PROJECTION APPARATUS, AND WAVELENGTH CONVERTER

(71) Applicant: Ricoh Company, Ltd., Tokyo (JP)

(72) Inventors: Mayu Banno, Kanagawa (JP); Toshinobu Matsuyama, Kanagawa (JP); Yuuto Akiba, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 467 days.

(21) Appl. No.: 18/086,698

(22) Filed: Dec. 22, 2022

(65) Prior Publication Data

US 2023/0236484 A1      Jul. 27, 2023

(30) Foreign Application Priority Data

Jan. 21, 2022      (JP) ................................. 2022-008218

(51) Int. Cl.
  *G03B 21/16*      (2006.01)
  *G03B 21/20*      (2006.01)
(52) U.S. Cl.
  CPC ........... *G03B 21/16* (2013.01); *G03B 21/204* (2013.01)
(58) Field of Classification Search
  CPC ............................ G03B 21/16; G03B 21/2043
  USPC ......................................................... 353/57
  See application file for complete search history.

(56) References Cited

U.S. PATENT DOCUMENTS

| | | | | |
|---|---|---|---|---|
| 12,105,406 | B2 * | 10/2024 | Tsai | ......................... F21V 29/51 |
| 2013/0329198 | A1 | 12/2013 | Matsuyama | |
| 2016/0062075 | A1 | 3/2016 | Matsuyama | |
| 2016/0131966 | A1 | 5/2016 | Matsuyama | |
| 2018/0066835 | A1 * | 3/2018 | Kobayashi | ........... H04N 9/3158 |
| 2020/0272091 | A1 | 8/2020 | Ashikagaya et al. | |

(Continued)

FOREIGN PATENT DOCUMENTS

| | | |
|---|---|---|
| CN | 1833105 A | 9/2006 |
| CN | 1967081 A | 5/2007 |
| CN | 104375366 A | 2/2015 |

(Continued)

OTHER PUBLICATIONS

Translation of CN_209233152_U (Year: 2025).*

(Continued)

*Primary Examiner* — Jerry L Brooks
(74) *Attorney, Agent, or Firm* — XSENSUS LLP

(57)      ABSTRACT

A cooling device, a light-source device, an image projection apparatus, and a wavelength converter. The cooling device includes a housing having a storage space, the storage space storing a heater and a base on which the heater is disposed, a heatsink at least partially disposed in the storage space and thermally connected to a space outside the storage space to dissipate heat generated by the heater to outside of the storage space, and an airflow path forming member covering at least some of the heatsink and forming a path for the heatsink to receive air flow absorbing the heat generated by the heater. In the cooling device, the heater or the base at least partially protruding from the airflow path member when the airflow path member is viewed in a direction orthogonal to a face of the heater on which light strikes.

19 Claims, 17 Drawing Sheets

(56)          References Cited

U.S. PATENT DOCUMENTS

| | | |
|---|---|---|
| 2020/0386489 A1 | 12/2020 | Baba et al. |
| 2021/0165308 A1 | 6/2021 | Matsuyama |

FOREIGN PATENT DOCUMENTS

| | | | |
|---|---|---|---|
| CN | 104635410 A | | 5/2015 |
| CN | 107949806 A | | 4/2018 |
| CN | 108693685 A | | 10/2018 |
| CN | 109643049 A | | 4/2019 |
| CN | 209147790 U | | 7/2019 |
| CN | 209233152 U | * | 8/2019 |
| CN | 111736412 A | | 10/2020 |
| JP | 2013-250422 | | 12/2013 |
| JP | 2016-066061 | | 4/2016 |
| JP | 2017076076 A | | 4/2017 |
| JP | 2020166201 A | * | 10/2020 |
| WO | WO 2015/166553 A1 | | 11/2015 |
| WO | 2017098705 A1 | | 6/2017 |

OTHER PUBLICATIONS

Translation of JP_2020166201_A (Year: 2025).*
Office Action issued Jul. 29, 2025 in corresponding Chinese Patent Application No. 202310084997.2 (15 pages; with English translation).
Japanese Office Action issued Aug. 19, 2025 in corresponding Japanese Patent Application No. 2022-008218 (5 pages; with English translation).
Office Action mailed Dec. 25, 2025 in corresponding Chinese patent application No. 202310084997.2 (16 pages; with English translation).

\* cited by examiner

AIRFLOW

AIRFLOW

COOLING AIR

FIG. 16

COOLING DEVICE, LIGHT-SOURCE DEVICE, IMAGE PROJECTION APPARATUS, AND WAVELENGTH CONVERTER

CROSS-REFERENCE TO RELATED APPLICATION

This patent application is based on and claims priority pursuant to 35 U.S.C. § 119(a) to Japanese Patent Application No. 2022-008218, filed on Jan. 21, 2022, in the Japan Patent Office, the entire disclosure of which is hereby incorporated by reference herein.

BACKGROUND

Technical Field

Embodiments of the present disclosure relate to a cooling device, a light-source device, an image projection apparatus, and a wavelength converter.

Background Art

In the light-source devices used for a projector, a light source that outputs light of, for example, red, green, yellow, and blue is required in order to generate white light. Typically, a solid-state light source such as a light-emitting diode (LED) or a laser beam source is used as the light source. However, for example, a solid-state light source of, in particular, green color, yellow color, or red color has a poor luminous efficiency of radiation and poor temperature characteristics, and projectors with sufficient brightness are difficult to achieve. In order to handle such a situation, in the light-source devices used for a projector in the related art, some techniques have been proposed that a phosphor is excited with blue laser beams having high luminous efficiency to generate the light of, for example, yellow color, green color, and red color. The phosphor generates heat when irradiated with the blue laser beam, but the light-transforming efficiency decreases as the temperature of the phosphor increases. In order to avoid such a situation, some techniques have already been proposed that the phosphor is actively cooled to prevent the light-transforming efficiency of the phosphor from decreasing.

For the purpose of increasing the cooling efficiency of a phosphor, some technologies have been proposed to drive a plurality of blades to rotate together with a phosphor wheel. Due to such a configuration, air flow can be generated in the storage space.

There is a demand for a technique for actively cooling not only the phosphor but also a member such as a heater that generates heat when struck or irradiated with light.

Typically, for dust-resistant purposes, a heater such as a phosphor that generates heat when struck or irradiated with light is arranged inside the storage space. In order to handle such a situation, thermal-conductive channels as in (A), (B), and (C) given below that conduct the heat through the air inside the storage space to dissipate the heat radiated from the heater to the outside of the storage space are known in the art.

(A): Heat conduction from heater or base whose temperature increases due to heat received from heater to air inside storage space (B): Heat conduction from air inside storage space to heatsink arranged in storage space (C): Heat conduction from heatsink arranged in storage space to dissipator outside storage space

SUMMARY

Embodiments of the present disclosure described herein provide a cooling device, a light-source device, an image projection apparatus, and a wavelength converter. The cooling device includes a housing having a storage space, the storage space storing a heater and a base on which the heater is disposed, a heatsink at least partially disposed in the storage space and thermally connected to a space outside the storage space to dissipate heat generated by the heater to outside of the storage space, and an airflow path forming member covering at least some of the heatsink and forming a path for the heatsink to receive air flow absorbing the heat generated by the heater. In the cooling device, the heater or the base at least partially protruding from the airflow path member when the airflow path member is viewed in a direction orthogonal to a face of the heater on which light strikes.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 16 is a diagram illustrating a configuration or structure of a light-source device according to a sixth embodiment of the present disclosure.

Figure 1:
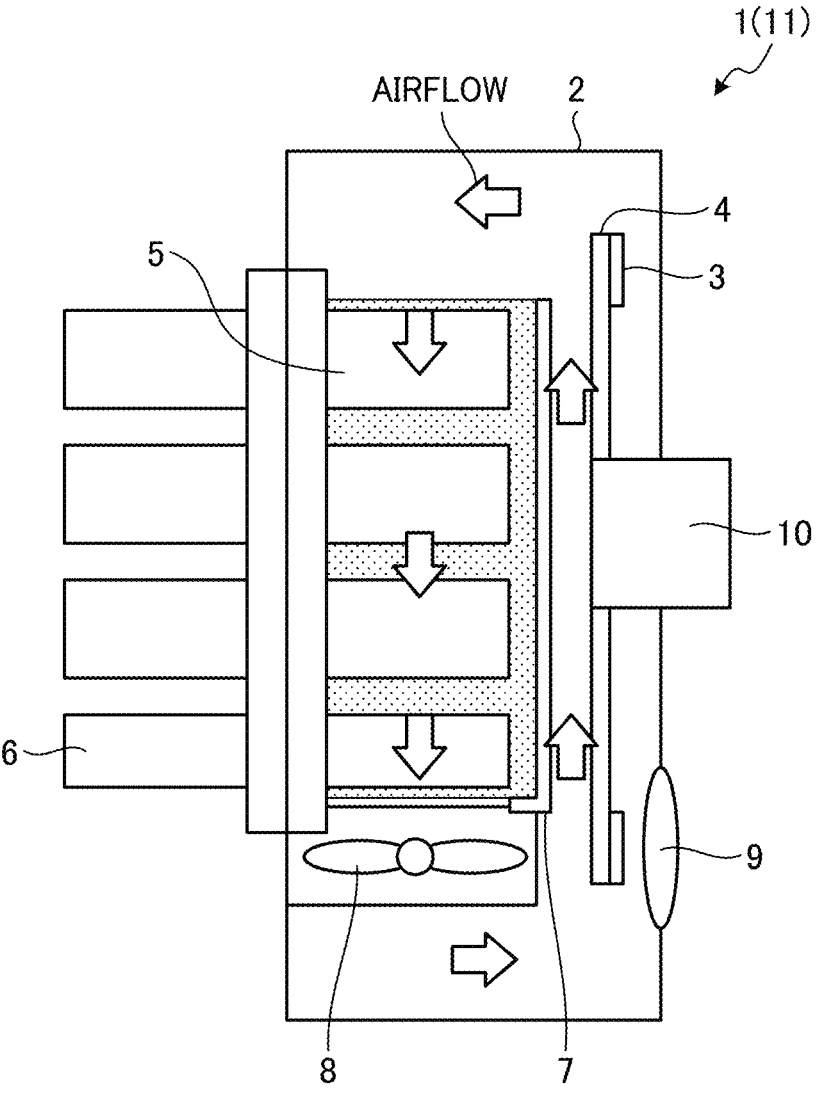
FIG. 1 is a diagram illustrating a configuration or structure of a wavelength converter according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a". "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A cooling device 11, a light-source device 20, an image projection apparatus, and a wavelength converter 1 according to an embodiment of the present disclosure are described below in detail with reference to the accompanying drawings.

Embodiments of the present disclosure are described below in detail with reference to the drawings. The following description is given by way of example, and no limitation is intended by the embodiments of the present disclosure described below. For example, the arrangement, the dimensions, or the dimensional ratio of the multiple elements that are illustrated in the drawings are not limited to the embodiments of the present disclosure described below. The term "housing" is not limited to a container in which the air cannot go across the walls of the container, and may be a dust-resistant container.

First Embodiment

FIG. 1 is a diagram illustrating a configuration or structure of a wavelength converter 1 according to a first embodiment of the present disclosure.

Figure 2:
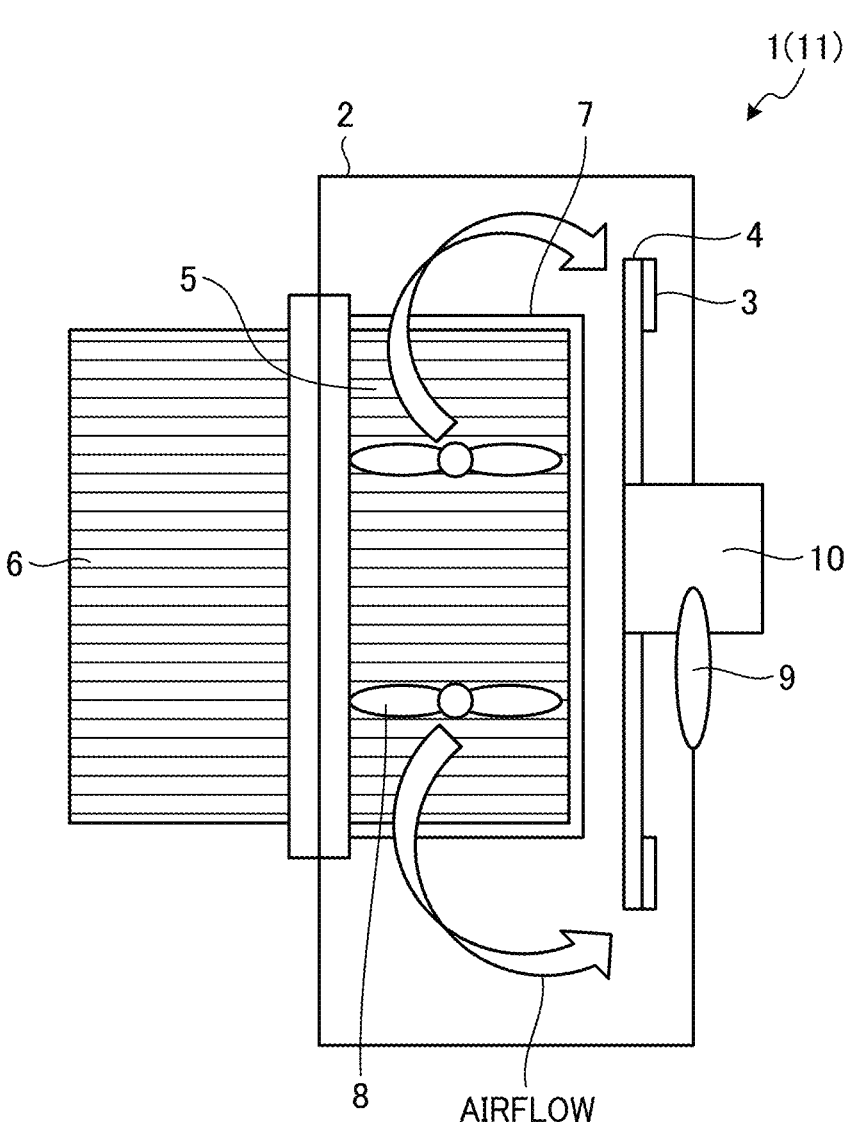
FIG. 2 is a diagram illustrating the wavelength converter 1 of FIG. 1 viewed in a direction where the air flow is exhausted, according to the first embodiment of the present disclosure.

FIG. 2 is a diagram illustrating the wavelength converter 1 of FIG. 1 viewed in a direction where the air flow is exhausted, according to the present embodiment.

Figure 3:
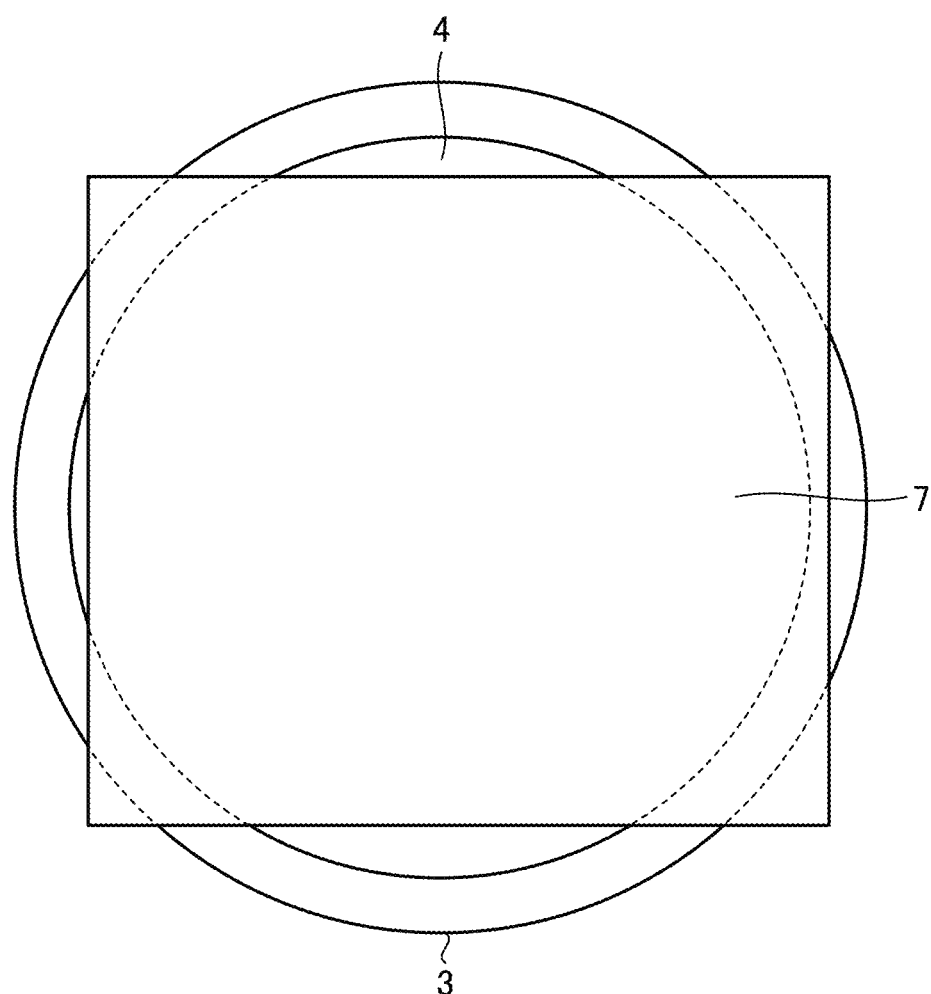
FIG. 3 is a diagram illustrating the relative positions of a heater, a base, and a duct that serves as an airflow path member, when the duct is viewed in a direction orthogonal to the face of the heater on which the light strikes, according to a first embodiment of the present disclosure.

FIG. 3 is a diagram illustrating the relative positions of the heater 3, the base 4, and the duct 7 that serves as an airflow path member, when the duct 7 is viewed in a direction orthogonal to the face of the heater 3 on which the light strikes, according to the present embodiment.

Figure 4:
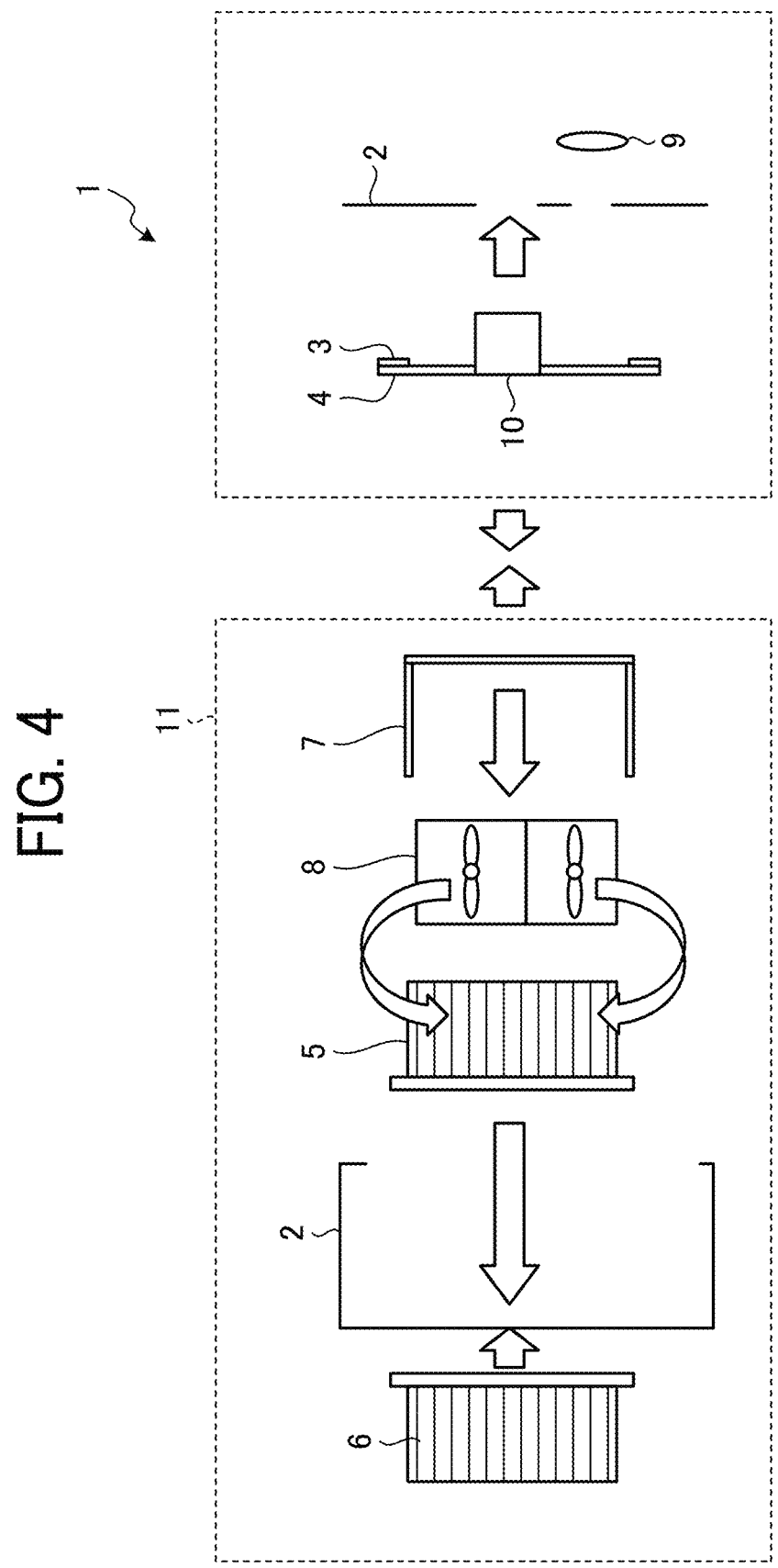
FIG. 4 is an exploded view of a wavelength converter according to an embodiment of the present disclosure.

FIG. 4 is an exploded view of the wavelength converter 1 according to the present embodiment.

Firstly, the elements of the wavelength converter 1, which includes the cooling device 11, are described.

As illustrated in FIG. 1 to FIG. 4, the wavelength converter 1 according to the present embodiment includes a housing 2, a heater 3, a base 4 that supports the heater 3, a heatsink 5, a dissipator 6, a duct 7 that serves as an airflow path member, an airflow generator 8, an optical component 9, and a driving source 10. The cooling device 11 according to the present embodiment includes the housing 2, the duct 7, the heatsink 5, and the airflow generator 8.

The housing 2 according to the present embodiment includes one or a plurality of components. The main structural frame of the housing 2 is made of, for example, metal. At least one hole or opening is formed on at one or a plurality of portions of the housing 2. For example, the hole or opening that is formed on the housing 2 may be closed by the optical component 9 or an element similar to the heatsink 5.

The heater 3 according to the present embodiment generates heat as irradiated with light, and is for example, a phosphor layer or wavelength conversion layer of a phosphor wheel or a color filter of a color wheel 22. In FIG. 3, the heater 3 is arranged at the outer edge of the base 4. However, no limitation is indicated thereby, and the heater 3 may be arranged at a position other than the outer edge of the base 4. It is not necessary for the heater 3 to cover or be disposed on the entirety of the outer edge of the base 4, and may cover only a portion of the outer edge of the base 4. Alternatively, a plurality of wavelength conversion layers may be disposed on some portions of the base 4 in a distributed manner as the heater 3. In other words, the heater 3 may be disposed on the entire surface of the base 4 or may be disposed on a portion of the base 4.

The base 4 on which the heater 3 is arranged is, for example, a wheel substrate having a circular and planar shape, and such a wheel substrate is coated with a phototransformation layer. The base 4 according to the present embodiment may be formed of a transmissive material or may be formed of reflective material. In the phosphor wheel, a phosphor layer that serves as the heater 3 may be applied on the base 4. In a color wheel 22, a layer that serves as a color filter and the heater 3 may be evaporated on the base 4.

The heatsink 5 contacts the air inside the storage space of the housing 2, and is thermally connected to the air outside the storage space of the housing 2. As a result, the heatsink 5 can dissipate the heat to the outside of the storage space while preventing dust from entering the storage space, and can lower the temperature of the heater 3. It is desired that the heatsink 5 be formed of a metal such as aluminum or copper with high thermal conductivity. The heatsink 5 has high heat-absorbing properties when the heatsink has a fin shape. However, the shape of the heatsink 5 is not limited to such a fin shape. The fin shape corresponds to any shape as long as it has unevenness, and includes all shapes such as a plate fin, a pin fin, and a corrugated fin. By forming the heatsink 5 into a fin shape, the heat exchange area between the circulating air and the heatsink 5 can be increased. Accordingly, the cooling efficiency of the heater 3 can be enhanced.

The heatsink 5 according to the present embodiment may be integrated with the dissipator 6, the housing 2, or the duct 7. Alternatively, another different component such as the housing 2 may have the function of the heatsink 5. The heatsink 5 is to be thermally connected to the outside of the storage space. However, the space between the storage space and the heatsink 5 may be a solid-state thermal-conductive component or may be a heat exchanger using a fluid such as a heat pipe or cooling liquid.

The dissipator 6 is thermally connected to the heatsink 5, and the storage space of the housing 2 has a portion facing the outside. It is desired that the dissipator 6 be formed of a metal such as aluminum (Al) or copper (Cu) with high thermal conductivity. The dissipator 6 can dissipate the heat efficiently when shaped like a fin. However, the shape of the dissipator 6 is not limited to such a fin shape. The fin shape corresponds to any shape as long as it has unevenness, and includes all shapes such as a plate fin, a pin fin, and a corrugated fin.

The dissipator 6 may be integrated with the heatsink 5 or the housing 2. Alternatively, another different component such as the housing 2 may have the function of the dissipator 6.

The duct 7 has a shape that covers the heatsink 5, and an intake port and an exhaust port are arranged so that an air flow can pass through the heatsink 5. For example, in the case of a plate fin as illustrated in FIG. 1, the duct 7 preferably has an intake port and an exhaust port arranged in a direction parallel to the surface of the plate fin. In the case of the heatsink 5 having no pin fin or uneven shape, the airflow easily flows regardless of the positions of the intake port and the exhaust port. However, as the pressure loss can be reduced when the air flow is not bent, it is desirable that the intake port and the exhaust port are not arranged to be orthogonal to each other.

The duct 7 may be integrated with other components such as the heatsink 5 and the housing 2 as long as the duct 7 can play a role in letting the air flow to the heatsink 5.

In FIG. 1 and FIG. 2, the outline of the heatsink 5 is a rectangular parallelepiped, and the shape of the duct 7 is also a rectangular parallelepiped. However, no limitation is indicated thereby, and the shape of the duct 7 may be different from the shape of the heatsink 5. The minimum distance between the duct 7 and the heatsink 5 is preferably equal to or narrower than 20 times the width between a pair of the multiple projections when the heatsink 5 has a plurality of projections or depressions, in order to allow a greater amount of wind to flow and reach the surface of the heatsink 5. However, no limitation is indicated thereby.

For example, in FIG. 1, an axial fan is used as the airflow generator 8, and the airflow generator 8 is fitted close to an end of the duct 7 where the air is exhausted. The airflow generator 8 is not limited to an axial fan, and may be any device such as a blower, a sirocco fan, or a piezoelectric element as long as it can generate the air flow. The airflow generator 8 may be a single airflow generator or may include a plurality of airflow generators.

The location of the airflow generator 8 may be selected or determined as desired. When the heatsink 5 is arranged downstream from the airflow generator 8, for example, a turbulent flow of the air flow that strikes the heatsink 5 can be generated around an area to which the air is exhausted by the airflow generator 8. As a result, the turbulent flow strikes the heatsink 5 as desired. Accordingly, the heat conductivity increases, and the cooling efficiency of the heater 3 can be enhanced. When the heatsink 5 is arranged upstream from the airflow generator 8, the air flows evenly on a downstream portion of the airflow generator 8. In such a configuration, the air can be flown evenly to the heatsink 5. Accordingly, the cooling efficiency of the heater 3 can be enhanced. It is desired that the airflow generator 8 be adjacent to the duct 7, and it is desired that the minimum distance between the airflow generator 8 and the duct 7 be equal to or shorter than half the longest dimension of the duct 7. The airflow generator 8 may be located inside the duct 7 or outside the duct 7.

Figure 5:
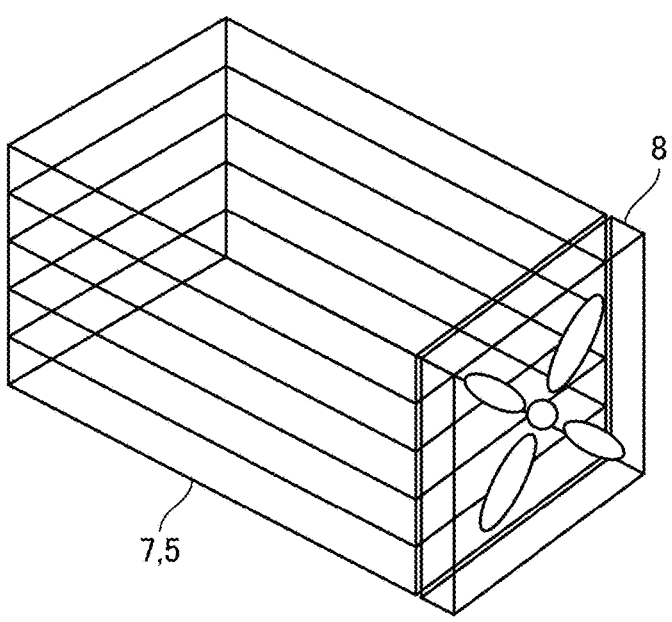
FIG. 5 is a diagram illustrating how an airflow generator is fitted, according to an embodiment of the present disclosure.

FIG. 5 is a diagram illustrating how the airflow generator 8 is fitted, according to the present embodiment.

In the present embodiment described with reference to FIG. 5, the duct 7 is formed integrally with the heatsink 5. The heatsink 5 illustrated in FIG. 5 in which a plurality of L-shaped or U-shaped heat-dissipating fins are stacked on top of each other serves as the duct 7 that makes the air flow difficult to escape or flow away. As illustrated in FIG. 5, the heatsink 5 has the airflow generator 8 on the face that serves as the duct 7.

The optical component 9 according to the present embodiment is, for example, a condenser lens that concentrates the light emitted from the light source so as to strike the heater 3. For example, the light that is emitted from the light source passes through a condenser lens before reaching and striking the heater 3. Due to such a configuration, even if the heater 3 is disposed in a narrow area, the light strikes only the area of the heater 3. As a result, the utilization efficiency of light in the optical system can be increased.

The driving source 10 according to the present embodiment is a motor that rotates the base 4 on which the heater 3 is mounted. As the heater 3 and the base 4 at high temperatures are rotated, the difference in the relative speed with the circulating air flow increases. Accordingly, the heat conductivity increases, and the cooling efficiency of the heater 3 can be enhanced. In FIG. 1 and FIG. 2, the driving source 10 is disposed on the face of the base 4 where the light strikes. However, no limitation is indicated thereby, and the driving source 10 may be disposed on the other side of the base 4 where the light does not strike. In FIG. 1 and FIG. 2, the driving source 10 is attached to the housing 2. However, no limitation is indicated thereby, and the driving source 10 may be connected to the housing 2 through other components such as a connecting component. In FIG. 1 and FIG. 2, the driving source 10 is attached to the housing 2. However, the driving source 10 may be attached to a different component such as the duct 7 or the heatsink 5.

As illustrated in FIG. 3, in the wavelength converter 1 according to the present embodiment, when the duct 7 is viewed in a direction orthogonal to the face of the heater 3 on which the light strikes, some of the heater 3 and the base 4 protrudes from the duct 7. In other words, the duct 7 does not completely cover the heater 3 and the base 4. A larger volume of air flows to the portion projecting from the duct 7 than to the portion not projecting from the duct 7. Accordingly, the portion that projects from the duct 7 can be cooled more efficiently than the portion not projecting from the duct 7. The portion that projects from the duct 7 may be a portion of the heater 3 and the base 4, or may be almost the entirety of the heater 3 and the base 4. The portion that projects from the duct 7 may a portion of one of the heater 3 and the base 4, or may be a portion of both the heater 3 and the base 4.

The air course for circulating the air flow in the storage space of the housing 2 is described below.

In FIG. 1 and FIG. 2, the flow of the air is indicated by arrows. As illustrated by the arrows in FIG. 1 and FIG. 2, the air flow that is ejected from the airflow generator 8 strikes the wall of the housing 2. Then, the air flow receives the heat from the heater 3, and strikes the base 4 at a high temperature. The air flow receives heat from the heater 3 and the base 4 while passing through the gap between the base 4 and the duct 7 and the gap between the base 4 and the housing 2, and the temperature of the air flow increases. The air flow whose temperature has increased enters the duct 7 through the intake port. In the duct 7, the high-temperature air flow passes through the heatsink 5. As a result, the heat of the air flow is dissipated to the heatsink 5, and the temperature of the air flow decreases. Such air flow whose temperature is lowered is injected by the airflow generator 8 again and circulates.

Figure 6:
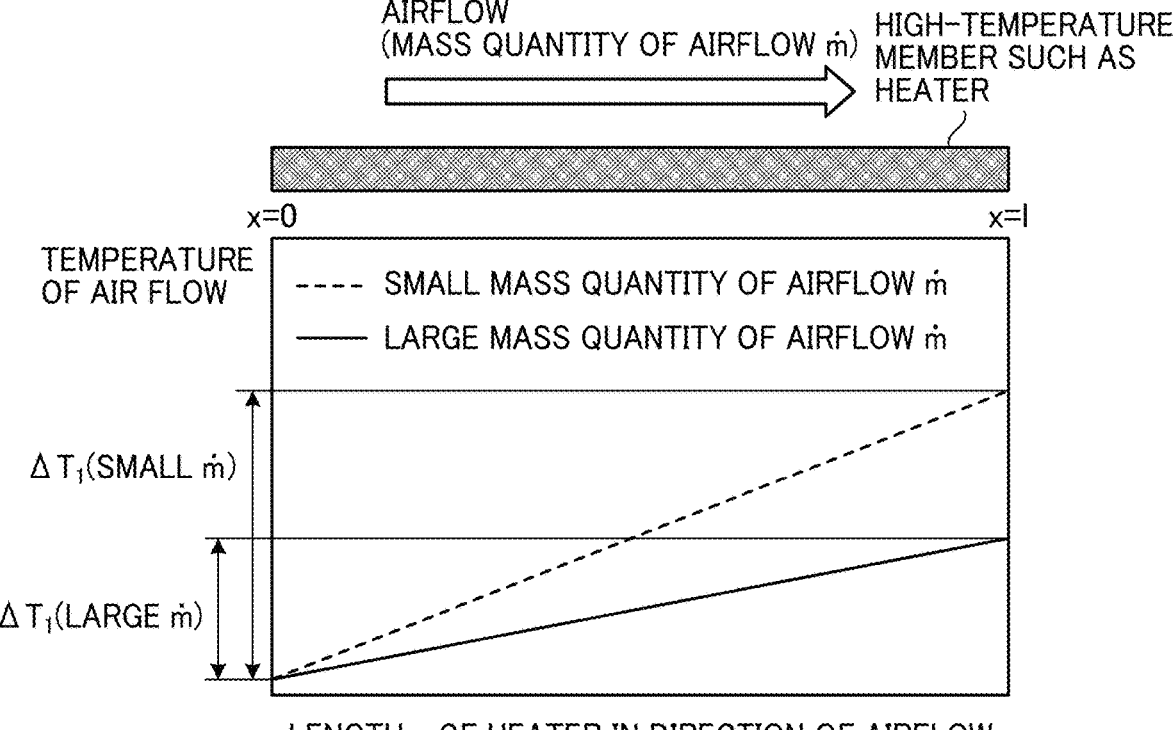
FIG. 6 is a diagram illustrating the relation between the length 1 of a heater in the air flow direction and the temperature of the air flow, according to an embodiment of the present disclosure.

FIG. 6 is a diagram illustrating the relation between the length 1 of the heater 3 in the air flow direction and the temperature of the air flow, according to the present embodiment.

As expressed in the first equation given below, by increasing the volume of air, which is referred to as m dot (dm/dt), of the circulating air that strikes the heater 3 and or base 4, the amount $\Delta T_1$ by which the temperature of the air increases while the air passes through the heater 3 and the base 4 can be controlled.

First Equation $$\Delta T_1 = \frac{\dot{Q}_1}{\dot{m} \cdot C_p}$$

$\Delta T_1$: Amount by which the temperature of the air has increased due to the heat received from the heater or the base $\dot{Q}_1$: Amount of heat dissipated to air from heater or base $\dot{m}$: Volume of Air (Mass Velocity)

$C_p$: specific heat of air

Due to such a configuration, even if the temperature difference $\Delta T_2$ between the heater 3 or the base 4 and the air as expressed in the second equation given below is constant or even if the length x of the heater 3 as depicted in FIG. 6 gets close to the length 1, the temperature $(T_{air}+\Delta T_1)$ of the air as expressed in the third equation given below can be kept at a low temperature. Accordingly, the temperature $T_{hot}$ of the heater 3 or the base 4 that serves as a high-temperature component can be kept at a low temperature. In other words, cooling can be effectively achieved.

Second Equation $$\Delta T_2 = \frac{\dot{Q}_2}{h \cdot A}$$

$\dot{Q}_2$: Amount of heat dissipated to air from heater or base h: Thermal conductivity between Air and Heater or Base A: Surface area of heater or base $$T_{hot} = (T_{air}+\Delta T_1)+\Delta T_2 \qquad \text{Third Equation}$$

$\Delta T_2$: Difference between Temperature of Air and Temperature of Heater or Base $T_{hot}$: Temperature of Heater or Base (High-temperature Component)

$T_{air}$: Temperature of Air before contacting High-temperature Component

As described above, according to the above embodiments of the present disclosure, the surfaces of the heater 3 or the base 4 whose temperature increases as struck or irradiated with light can be struck with a large volume of air, which is referred to as m dot (dm/dt), to cool down the surfaces of the heater 3 or the base 4 in an efficient manner. When the duct 7 is viewed in a direction orthogonal to the face of the heater 3 on which the light strikes, at least some of the heater 3 and the base 4 protrudes from the duct 7. A larger volume of air flows to the portion projecting from the duct 7 than to the portion not projecting from the duct 7. Accordingly, the portion that projects from the duct 7 can be cooled more efficiently than the portion not projecting from the duct 7.

In the present embodiment, a phosphor wheel that includes the heater 3, the base 4, and the driving source 10 is described by way of example. However, no limitation is indicated thereby.

The gas in the storage space of the housing 2 is not limited to the air, but may be different kinds of gas. Alternatively, the light source and other kinds of optical components including the optical component 9 may be included in the storage space of the housing 2.

Second Embodiment

A second embodiment of the present disclosure is described below.

The second embodiment of the present disclosure is different from the first embodiment of the present disclosure in that all of the heater 3 and the base 4 protrude from the duct 7. Note that like reference signs are given to elements similar to those described in the first embodiment, and their detailed description is omitted in the description of the second embodiment of the present disclosure.

Figure 7:
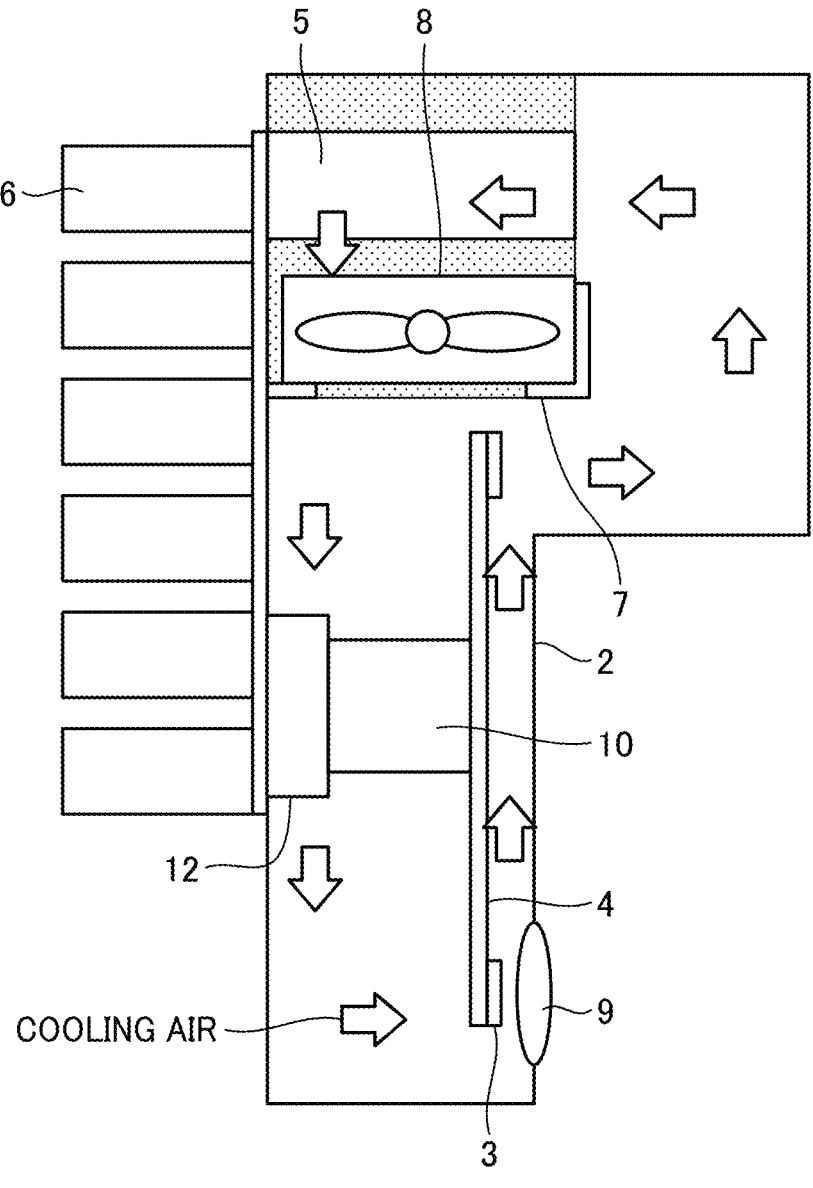
FIG. 7 is a diagram illustrating a configuration or structure of a wavelength converter according to a second embodiment of the present disclosure.

FIG. 7 is a diagram illustrating a configuration or structure of the wavelength converter 1 according to a second embodiment of the present disclosure.

Figure 8:
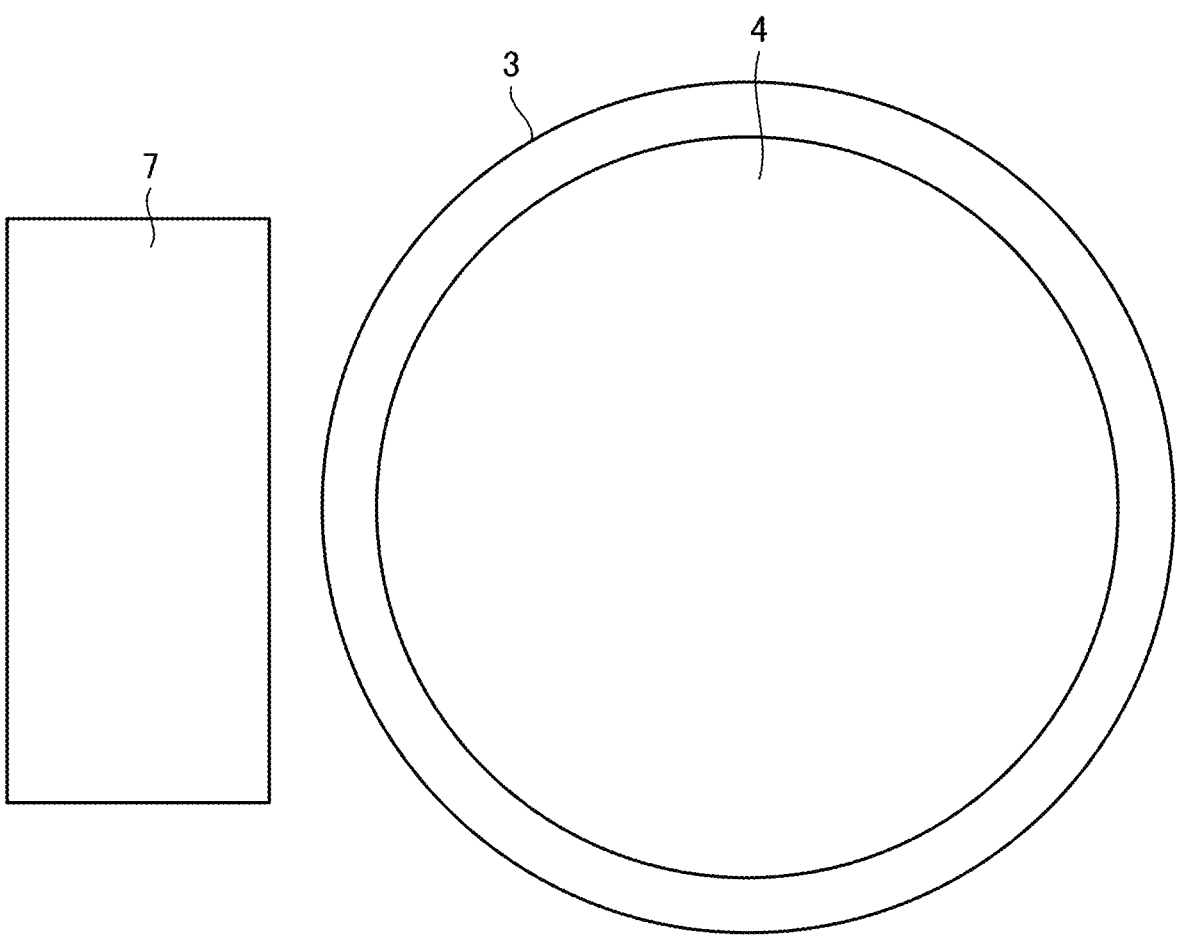
FIG. 8 is a diagram illustrating the relative positions of a heater, a base, and a duct that serves as an airflow path member, when the duct is viewed in a direction orthogonal to the face of the heater on which the light strikes, according to a second embodiment of the present disclosure.

FIG. 8 is a diagram illustrating the relative positions of the heater 3, the base 4, and the duct 7 that serves as an airflow path member, when the duct 7 is viewed in a direction orthogonal to the face of the heater 3 on which the light strikes, according to the present embodiment.

In the first embodiment of the present disclosure, some of the heater 3 and the base 4 protrudes from the duct 7 in the drawings where the duct 7 is viewed in a direction orthogonal to the face of the heater 3 on which the light strikes. As illustrated in FIG. 7 and FIG. 8, in the wavelength converter 1 according to the second embodiment of the present disclosure, all of the heater 3 and the base 4 protrude from the duct 7.

As described above, according to the second embodiment of the present disclosure, in comparison to the configuration in which some of the heater 3 and the base 4 protrudes from the duct 7, the air course does not get narrow around the heater 3 or the base 4 when all of the heater 3 and the base 4 protrude from the duct 7. Accordingly, a large volume of air strikes the heater 3 or the base 4 as desired.

Third Embodiment

A third embodiment of the present disclosure is described below.

The third embodiment is different from the first embodiment of the present disclosure in that, for example, the airflow generator 8 is arranged at a position close to an end of the duct 7 where the air is drawn up. Note that like reference signs are given to elements similar to those described in the first embodiment, and their detailed description is omitted in the description of the third embodiment of the present disclosure given below.

Figure 9:
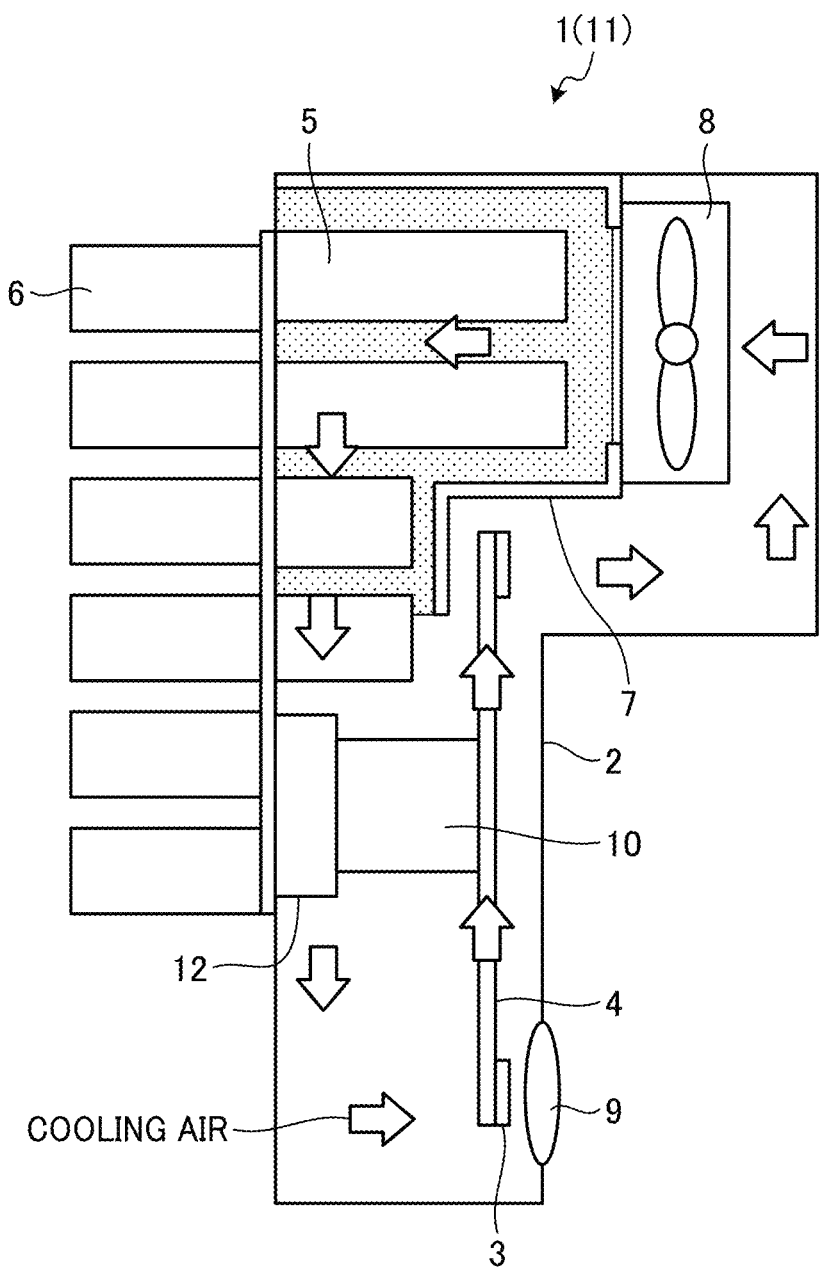
FIG. 9 is a diagram illustrating a configuration or structure of a wavelength converter according to a third embodiment of the present disclosure.

FIG. 9 is a diagram illustrating a configuration or structure of the wavelength converter 1 according to a third embodiment of the present disclosure.

Figure 10:
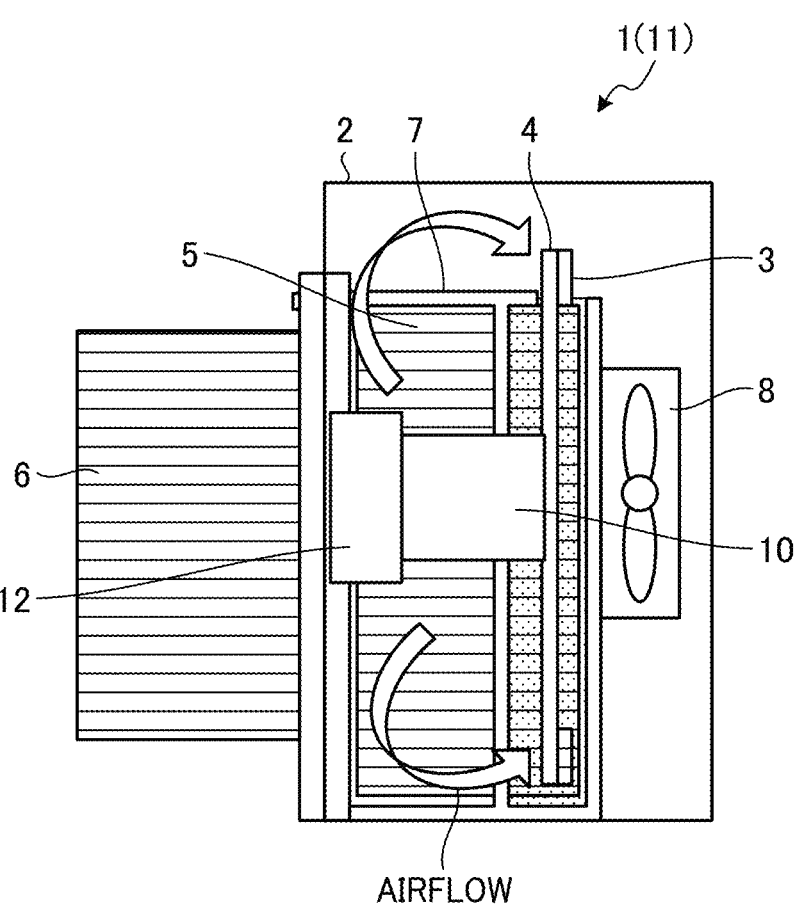
FIG. 10 is a diagram illustrating the wavelength converter of FIG. 9 viewed from the duct where the air flow is exhausted through an exhaust port, according to a third embodiment of the present disclosure.

FIG. 10 is a diagram illustrating the wavelength converter 1 of FIG. 9 viewed from the duct 7 where the air flow is exhausted, according to the present embodiment.

Figure 11:
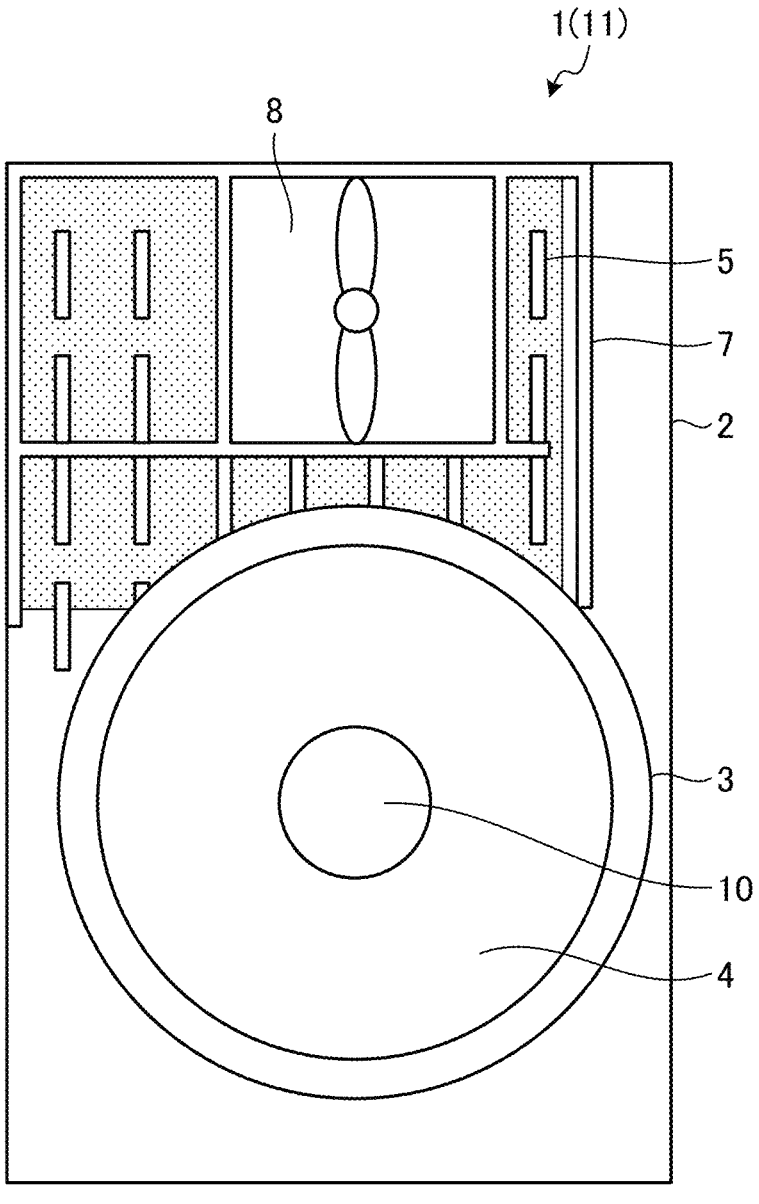
FIG. 11 is a diagram illustrating the relative positions of a heater, a base, and a duct that serves as an airflow path member, when a wavelength converter is viewed in a direction orthogonal to the face of the heater on which the light strikes, according to a third embodiment of the present disclosure.

FIG. 11 is a diagram illustrating the relative positions of the heater 3, the base 4, and the duct 7 that serves as an airflow path member, when the wavelength converter 1 is viewed in a direction orthogonal to the face of the heater 3 on which the light strikes, according to the present embodiment.

In the first embodiment of the present disclosure, the airflow generator 8 is arranged at a position close to an end of the duct 7 where the air is exhausted. As illustrated in FIG. 9, in the wavelength converter 1 according to the third embodiment of the present disclosure, the airflow generator 8 is arranged at a position close to an end of the duct 7 where the air is drawn up.

In the first embodiment of the present disclosure, the direction in which the airflow generator 8 generates and sends the air flow is orthogonal to the direction in which the light is incident on the heater 3. As illustrated in FIG. 9, FIG. 10, and FIG. 11, in the wavelength converter 1 according to the third embodiment of the present disclosure, the direction in which the air flow is sent out is parallel to the incident direction of the light.

In the first embodiment of the present disclosure, the direction in which the air is drawn up through the intake port of the duct 7 is parallel to the direction in which the air flows and the air is sent out through the exhaust port of the duct 7. As illustrated in FIG. 9, in the wavelength converter 1 according to the third embodiment of the present disclosure, the direction in which the air is drawn up through the intake port of the duct 7 is not parallel to the direction in which the air flows and the air is sent out through the exhaust port of the duct 7.

In the first embodiment of the present disclosure, the driving source 10 is attached to a side of the base 4 to which the heater 3 is attached. As illustrated in FIG. 9 and FIG. 10, in the wavelength converter 1 according to the third embodiment of the present disclosure, the driving source 10 is attached to a side of the base 4 on which the light is not incident. Due to such a configuration, a large volume of air strikes the surfaces of the driving source 10 as desired, and it is expected that the effectiveness of cooling increases.

In the first embodiment of the present disclosure, the driving source 10 is attached to the housing 2. In the wavelength converter 1 according to the third embodiment of the present disclosure described with reference to FIG. 9 and FIG. 10, the driving source 10 is fitted through a driving source holder 12.

In the first embodiment of the present disclosure, the heatsink 5 is entirely covered with the duct 7 when the duct 7 is viewed in a direction orthogonal to the face of the heater

3 on which the light strikes. As illustrated in FIG. 11, in the wavelength converter 1 according to the third embodiment of the present disclosure, some of the heatsink 5 may stick out from the duct 7 when the duct 7 is viewed in a direction orthogonal to the face of the heater 3 on which the light strikes.

As illustrated in FIG. 10, in the wavelength converter 1 according to the third embodiment of the present disclosure, the driving source 10 is mounted on the rear side of the installation side of the dissipator 6. Due to such a configuration, the heat of the heater 3 is transferred to, for example, the base 4, the driving source 10, and the driving source holder 12. As a result, the heat can easily be dissipated outside the storage space, and the temperature of the heater 3 can easily be lowered.

Typically, the driving source 10 has an upper-limit temperature in use, and the temperature of the driving source 10 needs to be prevented from increasing. In the wavelength converter 1 according to the third embodiment of the present disclosure, such a configuration and structure as illustrated in FIG. 9 is adopted, and the heat of the driving source 10 can be dissipated by the dissipator 6. As the air flow with lowered temperature is exhausted from the duct 7 and strikes the driving source 10, it is expected that the temperature of the driving source 10 can effectively be prevented from increasing.

Fourth Embodiment

A fourth embodiment of the present disclosure is described below.

For example, the fourth embodiment of the present disclosure is different from the first embodiment of the present disclosure in that a plurality of blades 14 are driven to rotate by the driving source 10 that drives the base 4 to rotate. Note that like reference signs are given to elements similar to those described in the first embodiment, and their detailed description is omitted in the description of the fourth embodiment of the present disclosure given below.

Figure 12:
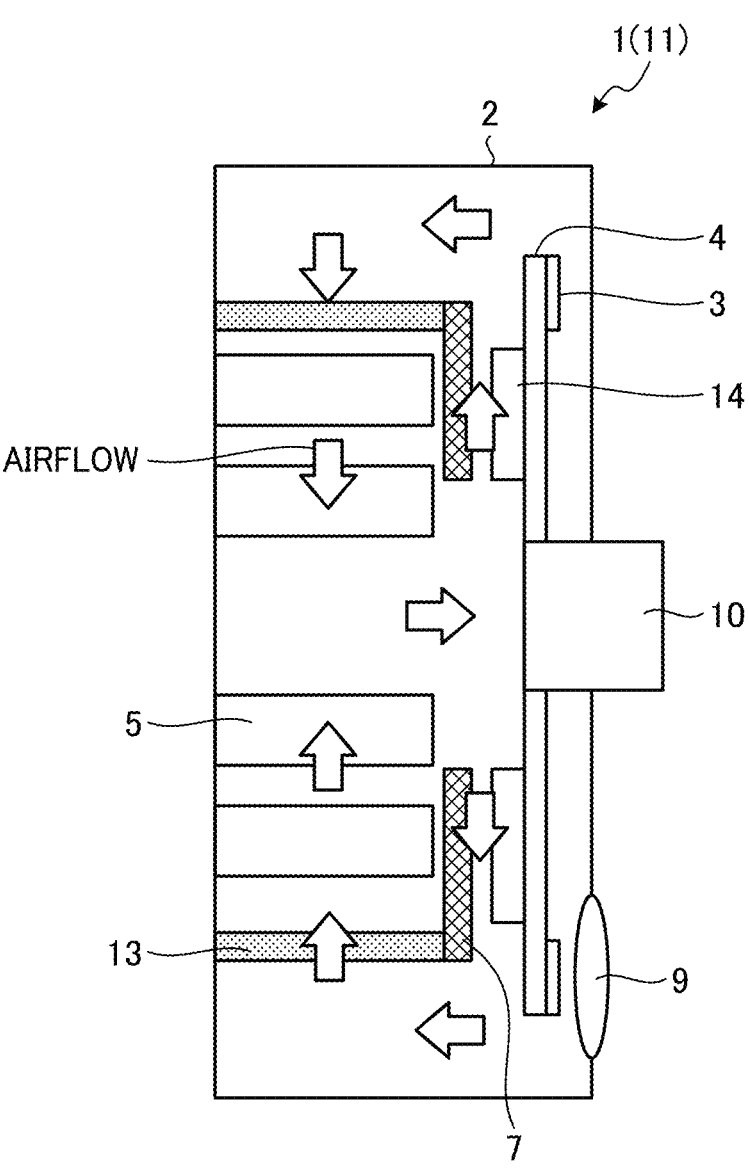
FIG. 12 is a diagram illustrating a configuration or structure of a wavelength converter according to a fourth embodiment of the present disclosure.

FIG. 12 is a diagram illustrating a configuration or structure of the wavelength converter 1 according to a fourth embodiment of the present disclosure.

Figure 13:
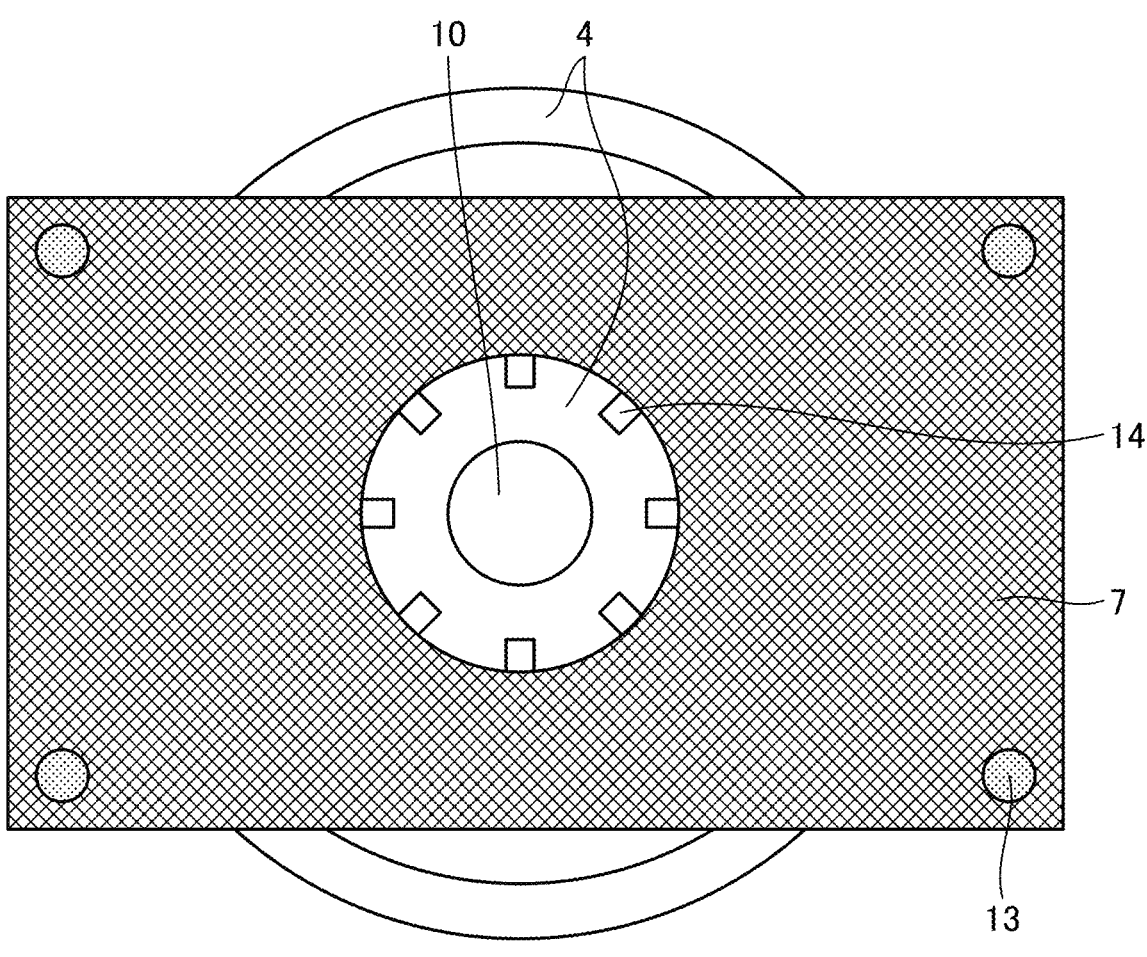
FIG. 13 is a diagram illustrating the relative positions of a heater, a base, and a duct that serves as an airflow path member, when the duct is viewed in a direction orthogonal to the face of the heater on which the light strikes, according to a fourth embodiment of the present disclosure.

FIG. 13 is a diagram illustrating the relative positions of the heater 3, the base 4, and the duct 7 that serves as an airflow path member, when the wavelength converter 1 is viewed in a direction orthogonal to the face of the heater 3 on which the light strikes, according to the fourth embodiment of the present disclosure.

As illustrated in FIG. 12 and FIG. 13, in the wavelength converter 1 according to the fourth embodiment of the present disclosure, the multiple blades 14 are driven to rotate by the driving source 10 that drives the base 4 to rotate. Due to such a configuration, an air flow from the center of rotation to the outer regions of the base 4 is generated by the centrifugal force, and circulating air flow is generated in the storage space. As a result, the driving source 10 and the multiple blades 14 serve as the airflow generator 8, and a reduction in size can be achieved.

As indicated by the arrows in FIG. 12, the air flow in the above configuration passes through the space between the duct 7 and the base 4 from the rotation center of the driving source 10 toward the outer regions of the base 4. The air flow whose temperature has risen as it has received the heat of the heater 3 through the base 4 as above enters the duct 7 from the outer regions of the duct 7 and passes through the heatsink 5. As a result, the temperature of the air flow decreases. The air whose temperature is lowered passes through the duct 7, and strikes the base 4. Then, the air flow flows from the rotation center to the outer regions of the base 4 again by the centrifugal force of the multiple blades 14.

As illustrated in FIG. 13, when the duct 7 is viewed in a direction orthogonal to the face of the heater 3 on which the light strikes, the outer regions of the base 4 protrude from the duct 7, and it is expected that a large volume of air strikes the protruding portions.

The multiple blades 14 may be attached to the base 4, or the base 4 may be processed to form the multiple blades 14 integrally. Alternatively, the multiple blades 14 may be attached to the driving source 10 independently from the base 4. The shape of the multiple blades 14 may be either linear or curved. The duct 7 as illustrated in FIG. 13 is a rectangular plate having a circular hole at the center thereof, and is held by a duct holder 13. However, no limitation is intended thereby. The shape of the duct 7 is not limited to a rectangular shape, and the hole at the center thereof is not limited to a circular shape. If the duct 7 is not a flat plate but has such a shape that it can be directly attached to other components, it is not necessary to use the duct holder 13.

According to the present embodiment as described above, the air flow can be generated in the storage space by the rotation of the multiple blades 14. Due to such a configuration, the functionality of the airflow generator 8 can be implemented without the provision of an airflow generator, and the wavelength converter 1 can be downsized.

Fifth Embodiment

A fifth embodiment of the present disclosure is described below.

The fifth embodiment of the present disclosure is different from the first embodiment of the present disclosure in that the heater 3 and the base 4 are not moved by the driving source 10. Note that like reference signs are given to elements similar to those described in the first embodiment, and their detailed description is omitted in the description of the fifth embodiment of the present disclosure given below.

Figure 14:
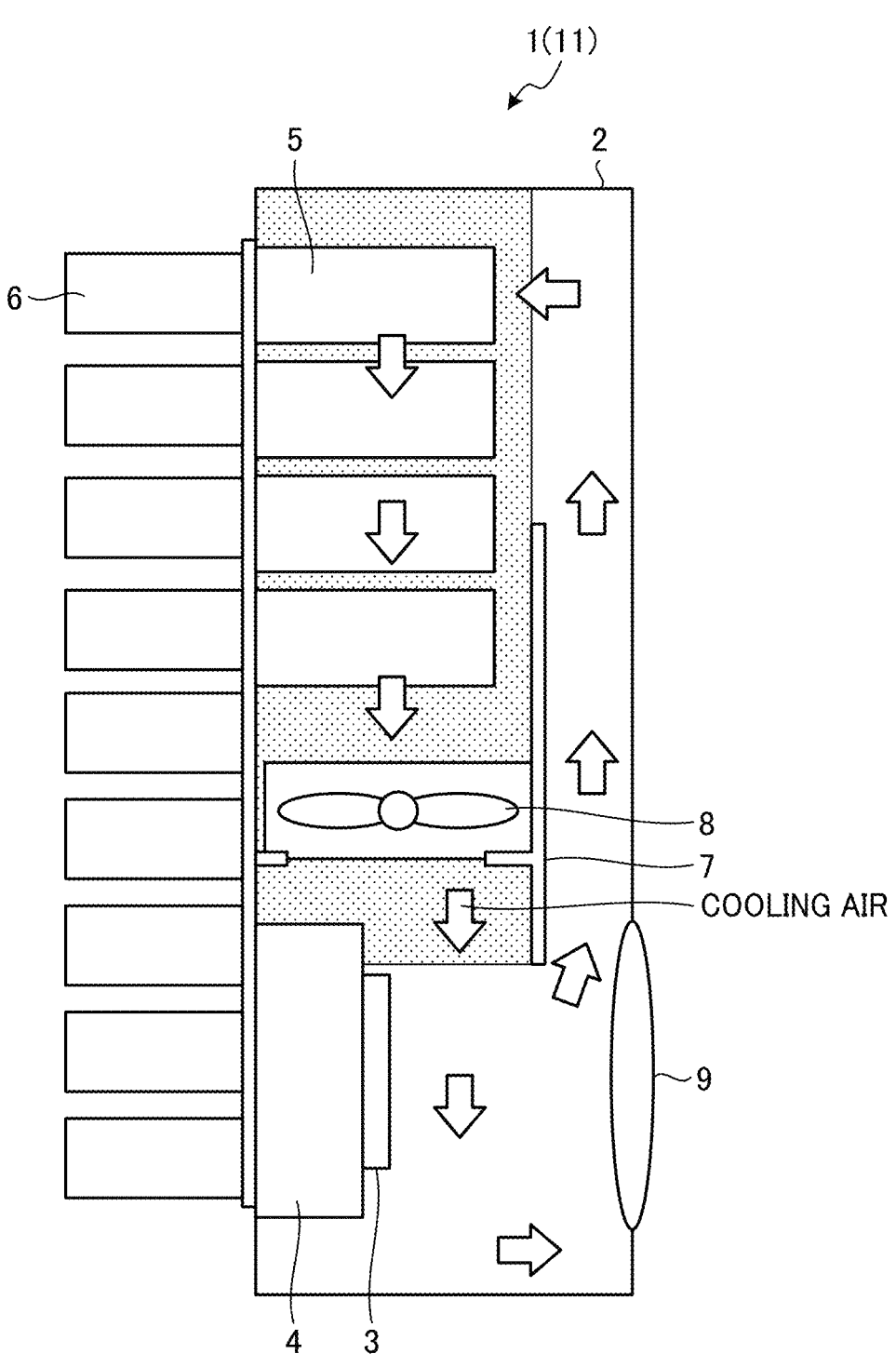
FIG. 14 is a diagram illustrating a configuration or structure of a wavelength converter according to a fifth embodiment of the present disclosure.

FIG. 14 is a diagram illustrating a configuration or structure of the wavelength converter 1 according to a fifth embodiment of the present disclosure.

Figure 15:
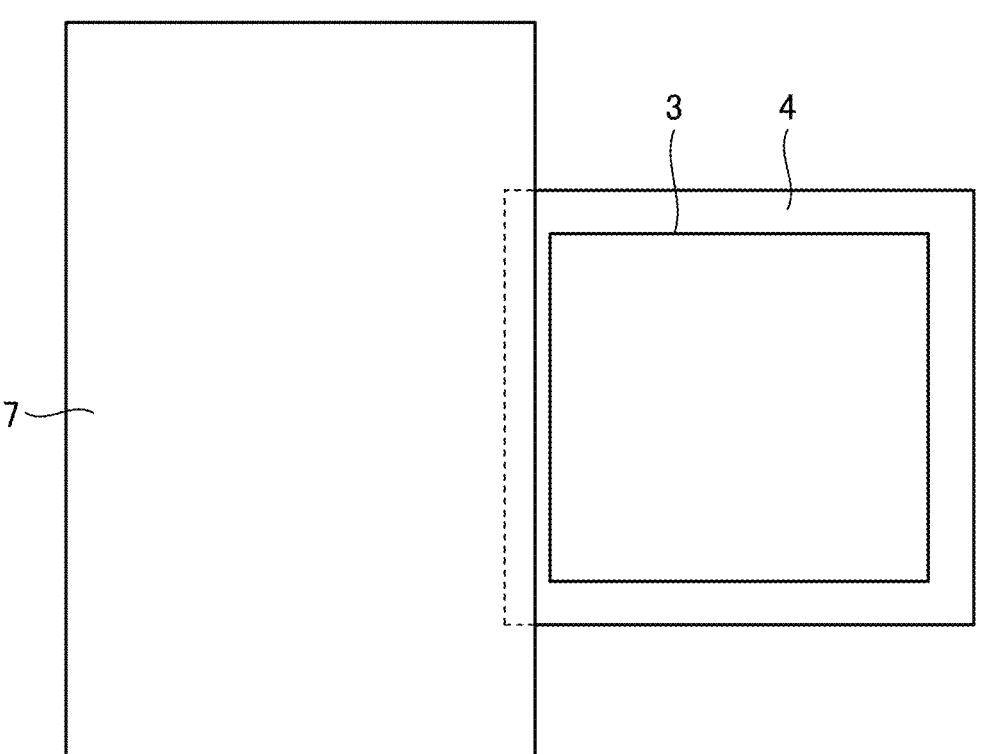
FIG. 15 is a diagram illustrating the relative positions of a heater, a base, and a duct that serves as an airflow path member, when the duct is viewed in a direction orthogonal to the face of the heater on which the light strikes, according to a fifth embodiment of the present disclosure.

FIG. 15 is a diagram illustrating the relative positions of the heater 3, the base 4, and the duct 7 that serves as an airflow path member, when the duct 7 is viewed in a direction orthogonal to the face of the heater 3 on which the light strikes, according to the fifth embodiment of the present disclosure.

As illustrated in FIG. 14 and FIG. 15, embodiments of the present disclosure are applicable to for example, the cooling of a stationary phosphor in which the heater 3 and the base 4 are not moved by the driving source 10. When the heater 3 does not move, the heat conduction to the air in the storage space depends only on the natural heat dissipation. For this reason, the forced convection in which a large volume of air is sent to the surfaces of the heater 3 and the base 4 using an airflow source such as the airflow generator 8 is effective for the heat dissipation to the air.

Sixth Embodiment

A sixth embodiment of the present disclosure is described below.

The sixth embodiment of the present disclosure is different from the first embodiment to the fifth embodiment of the present disclosure in that a light source module is provided with the wavelength converter 1 according to any desired one of the first embodiment to the fifth embodiment of the present disclosure. Note that like reference signs are given to elements similar to those described in the first embodiment to the fifth embodiment, and their detailed description is omitted in the following description of the sixth embodiment of the present disclosure.

Figure 16:
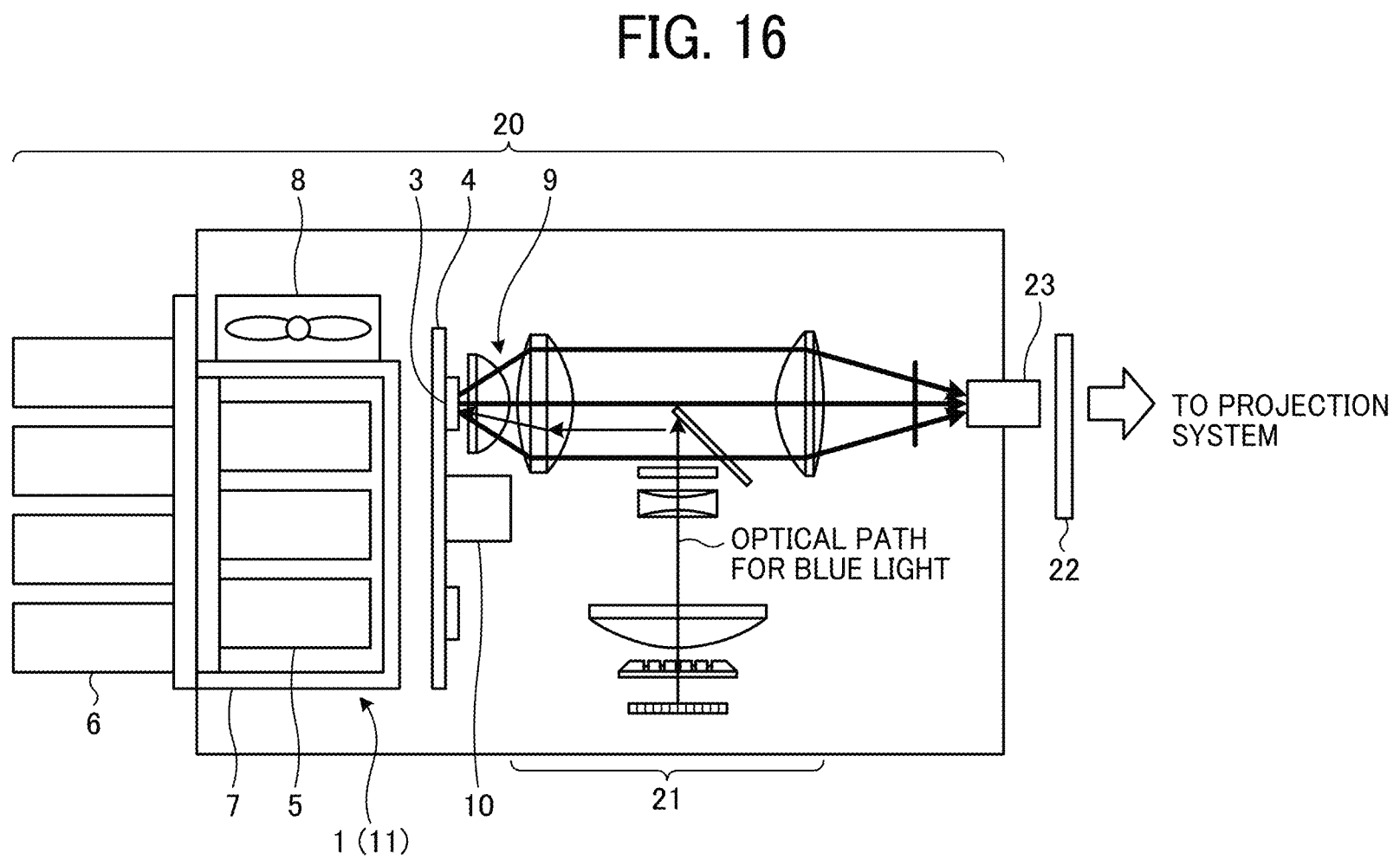

FIG. 16 is a diagram illustrating a configuration or structure of a light source module according to a sixth embodiment of the present disclosure.

As illustrated in FIG. 16, the light-source device 20 according to the sixth embodiment of the present disclosure is provided with the wavelength converter 1 according to any desired one of the first embodiment to the fifth embodiment of the present disclosure.

For example, when the LD light source 21 is used as the light source and cooling is performed by the wavelength converter 1 of the first embodiment, the light-source device 20 becomes as illustrated in FIG. 16.

The blue laser beam that is emitted from the LD light source 21 passes through various kinds of optical components including the optical component 9. Once the blue laser beam that is emitted from the LD light source 21 strikes a phosphor wheel including the heater 3 and the base 4, the blue laser beam is transformed to fluorescent light. Moreover, the light passes through the various kinds of optical components including the optical component 9, and the color is given to the light by a color wheel 22. Finally, the light heads for a projection system. The components up to the light mixing element 23 that levels the fluorescent light are referred to as a light-source device 20. With such a configuration, the light-source device 20 with high efficiency can be achieved.

Figure 17:
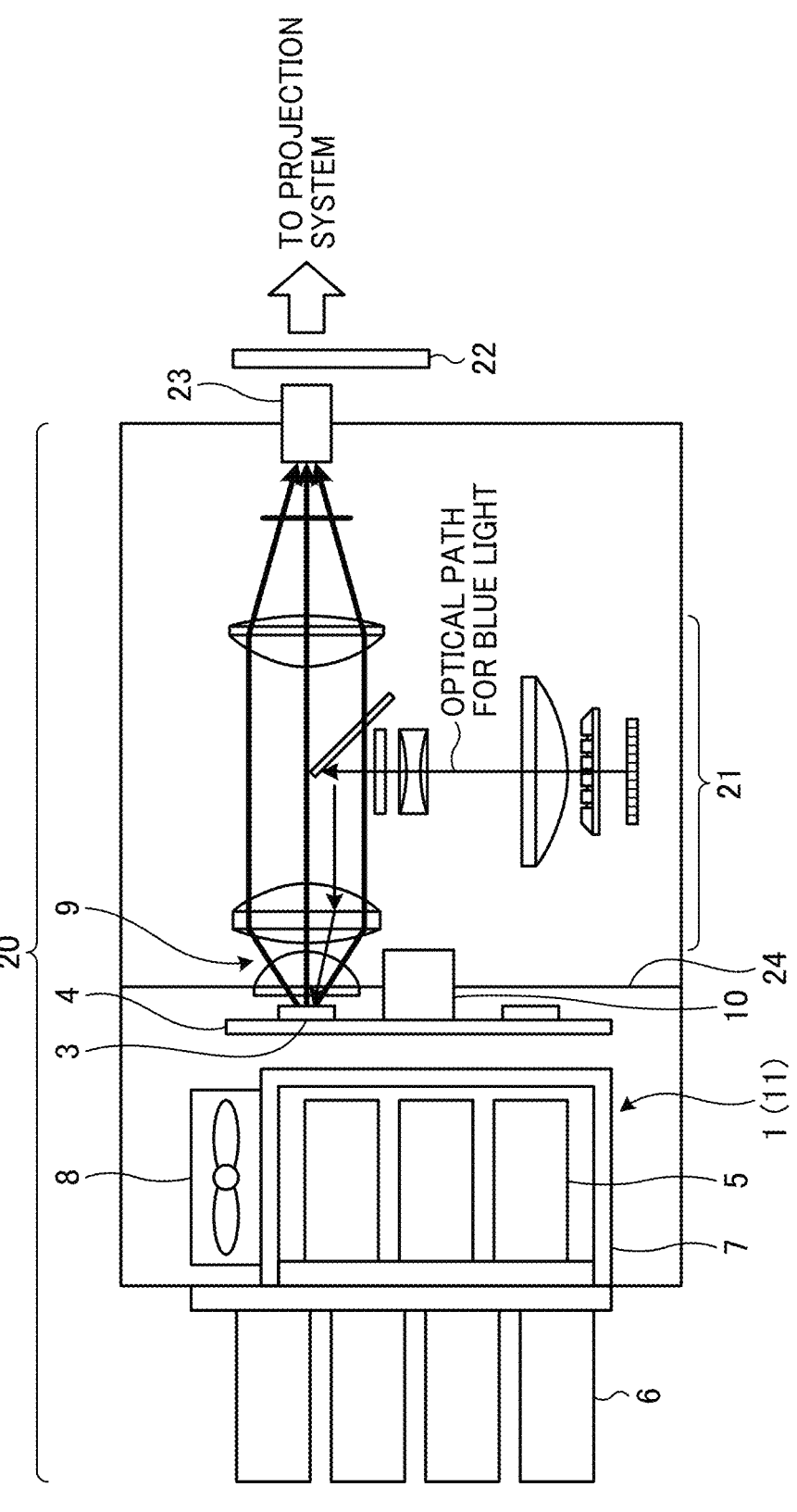
FIG. 17 is a diagram illustrating a light-source device according to a modification of the above embodiments of the present disclosure.

FIG. 17 is a diagram illustrating the light-source device according to a modification of the above embodiments of the present disclosure.

In the light-source device 20 according to the sixth embodiment of the present disclosure as illustrated in FIG. 16, the space in which the heater 3 is located is equivalent to the space in which the LD light source 21 is located. However, no limitation is indicated thereby, and as illustrated in FIG. 17, the first space in which the heater 3 is located may be differentiated from the second space in which the LD light source 21 is located. In such a configuration, a wall 24 that divides the space into two plays a role in sending a large volume of air with the heater 3 and the base 4. Due to such a configuration, compared with a configuration or structure in which a light source or an optical system is included in the air course for circulation, an even larger volume of air flow strikes the heater 3 or the base 4. As a result, the cooling efficiency of the heater 3 can be enhanced.

Seventh Embodiment

A seventh embodiment of the present disclosure is described below.

The seventh embodiment of the present disclosure is different from the first embodiment to the sixth embodiment of the present disclosure in that an image projection apparatus is provided with the light-source device 20 according to the sixth embodiment of the present disclosure. Note that like reference signs are given to elements similar to those described in the first embodiment to the sixth embodiment, and their detailed description is omitted in the following description of the seventh embodiment of the present disclosure.

Figure 18:
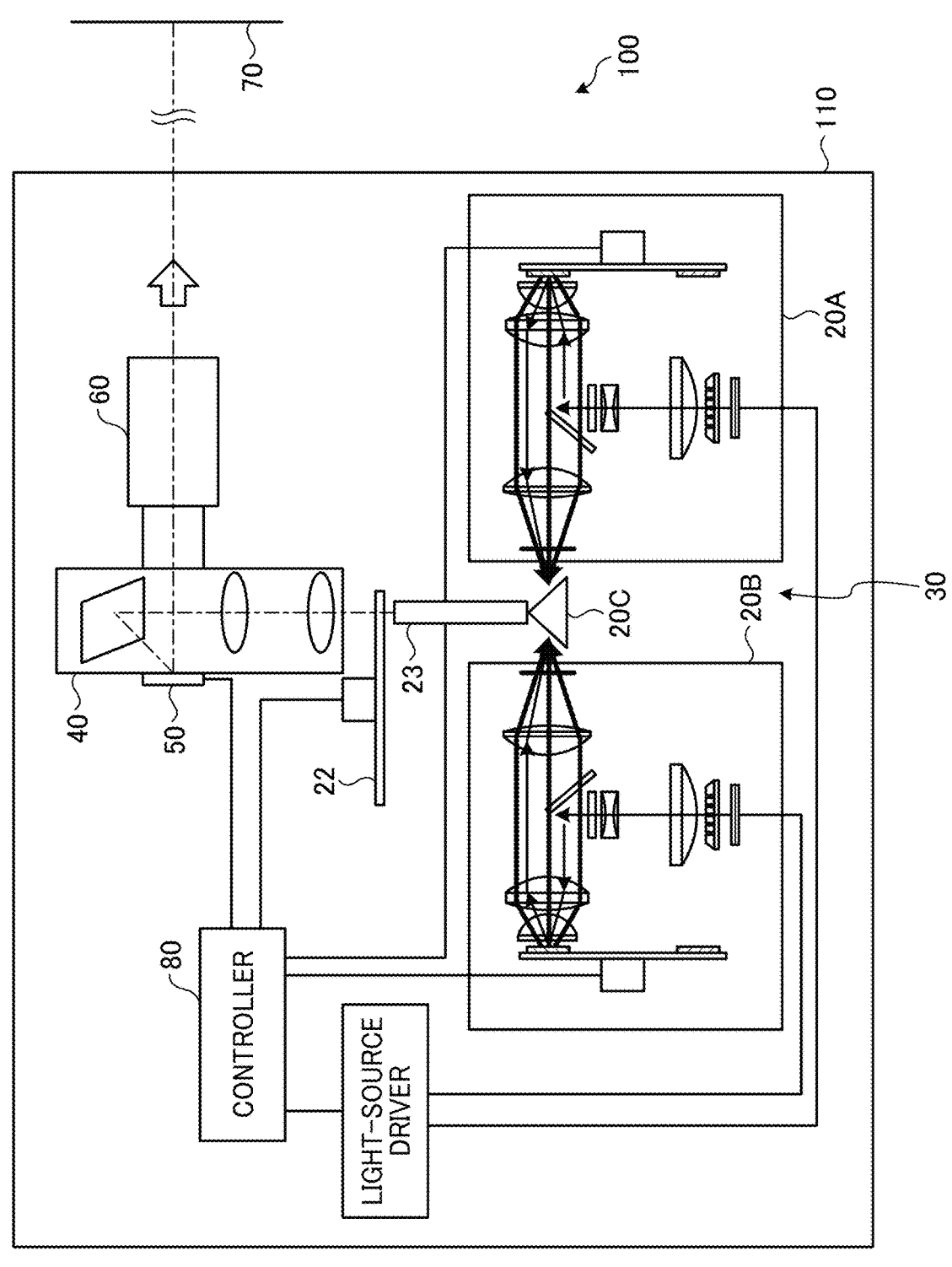
FIG. 18 is a schematic diagram illustrating a configuration or structure of a projector according to a seventh embodiment of the present disclosure.

FIG. 18 is a schematic diagram illustrating a projector 100 according to a seventh embodiment of the present disclosure.

The projector 100 according to the present embodiment that serves as an image projection apparatus includes a housing 110, a light source module 30, a light mixing element 23, an illumination optical system 40, an image forming element 50 that serves as an image display element, a projection optical system 60, a controller 80, and a color wheel 22.

The housing 110 according to the present embodiment accommodates the light source module 30, the light mixing element 23, the illumination optical system 40, the image forming element 50, the projection optical system 60, the controller 80, and the color wheel 22.

The light source module 30 emits, for example, the light including the wavelength corresponding to each color of red, green, and blue (RGB).

The light source module 30 according to the present embodiment includes a light source unit 20A that corresponds to the light-source device 20, a light source unit 20B that corresponds to the light-source device 20, and an optical-path combiner 20C that serves as a combining unit. The light source units 20A and 20B have the same structure and emit the light flux of light beams having a predetermined shape. The light flux that is emitted from each of the light source unit 20A and the light source unit 20B is deflected by optical-path combiner 20C, and is incident on the face of the light mixing element 23 on the light entering side. In the present embodiment, a prism is adopted as the optical-path combiner 20C. However, no limitation is indicated thereby.

As illustrated in FIG. 18, in the projector 100 according to the present embodiment, each one of the two bundles of laser beams that are being concentrated, which are output from the light source unit 20A and the light source unit 20B facing each other, are reflected and deflected by the two reflectors having an angle of approximately 90 degrees with each other, and are reflected into the same direction. In FIG. 18, the optical-path combiner 20C serves as the above two reflectors. Then, these two bundles of laser beams are combined together upon making those bundles of laser beams adjacent to each other or partially overlapped one another, and are incident on the light mixing element 23 at the same time.

The light source module 30 according to the present embodiment includes a pair of light source units 20A and 20B. However, no limitation is indicated thereby, and two or more light source units may be used to combine bundles of laser beams. For example, four light source units may be used to combine bundles of laser beams.

The light mixing element 23 mixes the light emitted from the light source module 30. As a result, equalization of the light is achieved. More specifically, the light mixing element 23 makes the bundle of laser beams incident on the light entering side propagate internally with repeated reflection, and makes the bundle of laser beam exit from the light-emitting surface. The light mixing element 23 internally reflects the bundle of laser beams incident on the light entering side a plurality of times. As a result, the light is evenly formed on the exit plane. As the light mixing element 23, for example, a light tunnel in which the inside is hollow and four mirrors are combined on the inner surface, a rod integrator in which a prism is formed of a transparent material such as glass, a fly-eye lens, or the like is used. For example, when a light tunnel is applied as the light mixing element 23, the aspect ratio of the image forming element 50 is made substantially equivalent to the aspect ratio of the light mixing element 23, and the shape of the exit of the light tunnel is projected onto a face of the image forming element 50. As a result, the light can efficiently be projected onto the face of the image forming element 50 with little loss.

The illumination optical system 40 approximately evenly irradiates the image forming element 50 with the light uniformized by the light mixing element 23. The illumination optical system 40 includes, for example, one or more lenses and one or more reflection planes.

For example, the image forming element 50 includes a light valve such as a digital micromirror device (DMD), a transmissive liquid crystal panel, and a reflective liquid crystal pane. The image forming element 50 modulates the light emitted from the illumination optical system 40 or the light emitted from the light-source optical system of the light-source device 20 to form the image.

For example, the controller 80 switches the face of the image forming element 50 on a pixel-by-pixel basis by reflecting or transmitting the illumination light emitted to the image forming element 50 in accordance with the input image, and guides the light to the projection optical system 60.

The projection optical system 60 magnifies the image formed by the image forming element 50 and projects the image onto a screen 70 that serves as a projection plane. The projection optical system 60 includes, for example, at least one lens. The projection optical system 60 is conjugated with the image forming element 50 such that an image on the face of the image forming element 50 is formed as a magnified image at a desired position of the screen 70 that serves as a projection plane. Due to such a configuration, the spatially-modulated image is magnified and projected onto the face of the image forming element 50.

At the exit of light of the light mixing element 23, a color wheel 22 that has a function to switch a plurality of color filters is arranged so as to extract, at least, a blue light component, a green light component, and a red light component. The color wheel 22 synchronizes the rotation of the base 4 used in each of the light source unit 20A and the light source unit 20B with the rotation of the color wheel 22, and switches the color filter in a synchronous manner. Moreover, the color wheel 22 displays the image on the face of the image forming element 50 according to the timing at which those color filters are switched to display the monochromatic image in sequence. As such a time for switching is shorter and faster than the response speed of the eyes, the image is recognized as a color image.

As described above, according to the above embodiments of the present disclosure, the light-source device 20 with high efficiency is adopted. Accordingly, the brightness in the embodiments of the present disclosure increases compared with the image projection apparatuses in the related art when the level of power is the same. When the brightness is the same, the power consumption can be reduced.

In the above description, preferred and specific embodiments of the present disclosure are described. However, no limitation is intended thereby. For example, a phosphor is described by way of example as a heater in the above embodiments of the present disclosure. However, the embodiments of the present disclosure may be applied to a configuration or structure in which a color filter provided for a color wheel is used as the heater.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A cooling device comprising:
a housing having a storage space, the storage space storing a heater and a base on which the heater is disposed;
a heatsink at least partially disposed in the storage space and thermally connected to a space outside the storage space to dissipate heat generated by the heater to outside of the storage space;
an airflow path member covering at least some of the heatsink and forming a path for the heatsink to receive air flow absorbing the heat generated by the heater; and
an optical component on the housing and facing the heater,
wherein the heater or the base at least partially protrudes from the airflow path member when the airflow path member is viewed in a direction orthogonal to a face of the heater on which light strikes,
wherein the base is between the airflow path member and the optical component,
wherein, when viewed in the direction orthogonal to the face of the heater on which light strikes, portions of the heater protrude toward the optical component, and
wherein the heater or the base protrudes from the airflow path member and does not protrude from the airflow path member alternately at at least two pairs of continuous portions.

2. The cooling device according to claim 1, wherein the heatsink has a fin shape.

3. The cooling device according to claim 1, further comprising an airflow generator configured to generate the air flow in the storage space.

4. The cooling device according to claim 3, wherein the heatsink is disposed downstream from the airflow generator in a direction of the airflow.

5. The cooling device according to claim 3, wherein the heatsink is disposed upstream from the airflow generator.

6. The cooling device according to claim 1, further comprising a driving source configured to drive the base to rotate.

7. The cooling device according to claim 6, further comprising a blade configured to be driven by the driving source to rotate.

8. The cooling device according to claim 1, wherein the airflow path member is configured integrally with the heatsink.

9. A light-source device comprising:
the cooling device as claimed in claim 1; and
a light source configured to irradiate the heater with light.

10. The light-source device according to claim 9, wherein the heater is a phosphor.

11. The light-source device according to claim 9, further comprising a wall separating a first space including the heater from a second space including the light source.

12. An image projection apparatus comprising:
a light-source device including
a cooling device including:
a housing having a storage space, the storage space storing a heater and a base on which the heater is disposed,
a heatsink at least partially disposed in the storage space and thermally connected to space outside the storage space to dissipate heat generated by the heater to outside of the storage space,
an airflow path member covering at least some of the heatsink and forming a path for the heatsink to receive air flow absorbing the heat generated by the heater,
an optical component on the housing and facing the heater, and
a light source configured to irradiate the heater with light, the heater or the base at least partially protruding from the airflow path member when the airflow path member is viewed in a direction orthogonal to a face of the heater on which the light strikes;
a light mixing element configured to level the light received from the light-source device and output the leveled light;
an image display element configured to modulate the light output from the light mixing element to form an image; and
a projection optical system configured to magnify and project the image on a projection surface,
wherein the base is between the airflow path member and the optical component,
wherein, when viewed in the direction orthogonal to the face of the heater on which light strikes, portions of the heater protrude toward the optical component, and
wherein the heater or the base protrudes from the airflow path member and does not protrude from the airflow path member alternately at at least two pairs of continuous portions.

13. A wavelength converter comprising:
the cooling device according to claim 1; and
a phosphor configured to serve as the heater.

14. A cooling device comprising:
a housing having a storage space, the storage space storing a heater and a base on which the heater is disposed;
a heatsink at least partially disposed in the storage space and thermally connected to a space outside the storage space to dissipate heat generated by the heater to outside of the storage space;
an airflow path member covering at least some of the heatsink and forming an airflow path for the heatsink to receive an airflow that absorbs the heat generated by the heater; and
an optical component on the housing and facing the heater,
wherein the heater or the base at least partially protrudes from the airflow path member when the airflow path member is viewed in a direction orthogonal to a face of the heater on which light strikes,
wherein the base is between the airflow path member and the optical component,
wherein, when viewed in the direction orthogonal to the face of the heater on which light strikes, portions of the heater protrude toward the optical component, and wherein the airflow path for the heatsink to receive the airflow that absorbs the heat generated by the heater includes:

a first airflow portion between the housing and the face of the heater on which light strikes and between the airflow path member and the base, a second airflow portion through the heatsink, the airflow path member being between the first airflow portion and the second airflow portion, and a turning airflow portion that connects the first airflow portion and the second airflow portion.

15. A wavelength converter comprising:

the cooling device according to claim 14; and a phosphor configured to serve as the heater.

16. The cooling device according to claim 14, wherein the optical component is at an upstream side of the first airflow portion such that the optical component is directly between the turning airflow portion and the first airflow portion.

17. The cooling device according to claim 14, further comprising an airflow generator in the housing and configured to generate the airflow, the airflow generator being at a downstream side of the second airflow portion such that the airflow generator is directly between the second airflow portion and the turning airflow portion.

18. The cooling device according to claim 17, wherein the optical component is aligned with the airflow generator in the direction orthogonal to the face of the heater on which light strikes.

19. The cooling device according to claim 17, wherein a direction in which the airflow generator generates the airflow intersects with the direction orthogonal to the face of the heater on which light strikes.

* * * * *